US006541052B1

(12) United States Patent
Rohleder

(10) Patent No.: US 6,541,052 B1
(45) Date of Patent: Apr. 1, 2003

(54) METHODS AND APPARATUS FOR SAMPLING PRODUCT AROMAS

(76) Inventor: Peter J. Rohleder, Residence Cologny Parc, 9a, Plaleau de Frontenex, CH-1208 Geneva (CH)

(*) Notice: Subject to any disclaimer, the term of this patent is extended or adjusted under 35 U.S.C. 154(b) by 0 days.

(21) Appl. No.: 09/345,833

(22) Filed: Jul. 1, 1999

(51) Int. Cl.[7] .......... A21D 13/00

(52) U.S. Cl. .......... 426/132; 426/87; 426/383; 426/386; 426/392; 436/8; 436/9; 436/20

(58) Field of Search .......... 436/3, 5, 8, 9, 436/20, 55; 424/10.1, 10.4; 426/87, 88, 106, 110, 112, 132, 135, 383, 386, 392; 512/2, 4; 206/459.1, 459.5

(56) References Cited

U.S. PATENT DOCUMENTS 3,844,057 A 10/1974 Johnson
3,967,880 A 7/1976 Johnson
4,123,592 A * 10/1978 Rainer et al. .......... 428/532
4,145,001 A 3/1979 Weyenberg et al.
4,208,098 A 6/1980 Johnson
4,277,024 A 7/1981 Spector
4,484,768 A 11/1984 Norfleet
4,720,423 A 1/1988 Fraser
5,000,486 A 3/1991 Rua, Jr. et al.
5,041,296 A * 8/1991 Byrne .......... 426/241
5,249,676 A * 10/1993 Ashcraft et al. .......... 206/264
5,534,105 A 7/1996 Boyd
5,635,229 A * 6/1997 Ray .......... 426/112
5,688,545 A * 11/1997 Sanders .......... 426/120
5,925,390 A * 7/1999 Kornacki .......... 426/87
6,045,833 A * 4/2000 Landau .......... 426/2
6,053,738 A * 4/2000 Ivey, Jr. .......... 434/127
6,066,347 A * 5/2000 Prasad et al. .......... 426/107
6,106,875 A * 8/2000 Soper et al. .......... 426/89
6,223,912 B1 * 5/2001 Nerushai et al. .......... 211/59.2
6,248,377 B1 * 6/2001 Levine .......... 426/87
6,311,461 B2 * 11/2001 Craig et al. .......... 53/449
6,319,537 B1 * 11/2001 Cheng et al. .......... 426/594
6,368,633 B1 * 4/2002 Lou et al. .......... 424/489

FOREIGN PATENT DOCUMENTS

WO WO 93/09818 * 5/1993 .......... A61L/9/12

OTHER PUBLICATIONS

Ian Horman—"Mass Spectrometry," Analysis of Foods and Beverages by Academic Press, Inc.—1984; pp. 141–203.

* cited by examiner

*Primary Examiner*—Jill Warden
*Assistant Examiner*—Dwayne K Handy
(74) *Attorney, Agent, or Firm*—Covington & Burling

(57) ABSTRACT

This invention provides methods and apparatus that enable consumers to experience, prior to purchase, the aroma of a finished product even though the product as sold is unfinished. Further, methods and apparatus provide users of a product with a reference aroma that may be employed to determine if the product is suitable for use, while, prior to purchase, consumers can experience a selected aroma of a consumer product that has a plurality of aromas, and the aroma bouquet of a consumer product where a particular aroma in the bouquet has been intensified. Among other advantages, this invention enables marketers to employ additional sensual modalities, and particularly the sense of smell, in offering products for sale, and thus permits consumers to make better informed purchasing decisions. A preferred embodiment of a method of the invention includes the steps of characterizing an aroma of a finished state of a consumer product; synthesizing the aroma, responsive to the characterization; and associating the synthesized aroma with the consumer product.

74 Claims, 5 Drawing Sheets

METHODS AND APPARATUS FOR SAMPLING PRODUCT AROMAS

BACKGROUND OF THE INVENTION

This invention relates to sampling the aromas of products, and more particularly to methods that enable consumers to experience the aromas of products prior to making purchasing decisions and to aroma-based methods that enable purchasers to determine if products have reached certain states, for example, to determine if a product has spoiled.

DESCRIPTION OF THE RELEVANT ART

Consumers are saturated with advertising for products from television, radio, the print media, and store displays. Unfortunately, the vast bulk of this advertising has been directed at consumer's visual and auditory senses, thus creating a wall of visual and auditory background "noise" from which it is difficult to make any product stand out. Aside from special circumstances, few attempts are made to direct advertising at consumer's senses of touch, smell, and taste.

This problem was particularly significant in the perfume industry, where the appeal of perfumes is limited almost exclusively to the sense of smell. Great efforts have been expended in developing unique visual images to sell perfume. Advances in packaging technology created a revolution in this industry by permitting samples of perfumes to be distributed in the print media through microencapsulation and other techniques. Further development and application of aroma distribution technologies to other areas have, however, been limited. This may be due to the unique characteristics of perfume as a product, i.e., it is sold purely on the basis of smell and "image," and samples of the product can be directly encapsulated for distribution (the samples do not spoil or otherwise present an obvious health hazard).

In some industries, such as the food industry,.the focus on the visual and auditory senses may have resulted from packaging, security, and hygiene concerns as discussed below. In earlier eras, consumers may have been able to enter marketplaces or bakeries and directly experience food samples with all five of their senses. Aside from limited and very costly (to the advertiser) free sample kiosks in some stores, and the fruits/vegetables counters, it is rarely possible for modern consumers to experience many food products with more than their visual senses prior to purchase.

Packaging concerns are driven by both manufacturing efficiency and consumer convenience considerations, and are closely related to security and hygiene concerns. From the efficiency point of view, it is often desirable to package food in relatively small, uniform units that can survive the distribution chain with a high degree of quality control. It is often desirable to package food in an unfinished state since certain bulky ingredients (such as water) may be removed, and the shelf life of the product may be extended. Consumer convenience is also enhanced because of the availability of food ingredients in pre-measured quantities and of uniform quality.

Security and hygiene concerns are different aspects of the same problem, i.e., preventing foreign substances, whether poisons, dirt, or biological materials, from contaminating food. Sealed and secured packaging effectively prevents food from contamination, but it also prevents direct experience of the product through the senses before purchase.

As mentioned above, the packaging of food and other products often limits the advertiser of those products to a few sensory modalities. At the same time more and more manufacturers, with more and more products, are fighting for shelf space at stores. As an example of the interplay of these considerations, a typical supermarket may stock 60 different varieties of coffee. Many manufacturers offer multiple varieties of coffee under their same brands. Coffee must also remain in airtight packing since it rapidly loses freshness when exposed to the atmosphere. Traditionally, coffee has been advertised through visual/audio media. Yet, the appeal of coffee and the characteristics that distinguish the varieties lie almost exclusively in the senses of taste and smell. Manufacturers are thus in the difficult situation of attempting to distinguish, on the basis of visual/audio advertising, scores of varieties of a product that is purchased for its taste and smell. Additional advertising options are needed to distinguish products and to better align the methods used to advertise the product (such as visual images) with the characteristics that motivate consumer purchasing decisions (such as taste/smell).

The inability to effectively distinguish products through the use of the usual visual/audio techniques becomes particularly acute in market situations where the cost to consumers of making a mistake is high. This situation exists in many developing countries where markets may be flooded with goods from industrialized nations but average consumer income is low. A high income consumer may be able to purchase products in order to sample them. A low income consumer may have no choice but to fully consume any product that is purchased. Methods are needed that enable consumers to make better informed product selections prior to purchase.

Many products change as they age, and some products develop a unique smell when they are no longer suitable for use. For example, it is well known that meat that develops a certain odor should not be consumed. Unfortunately, smells are difficult to describe in words, and people have generally relied on instinct and personal experience to indicate when the smell of a product suggests that it has "gone bad." When people have no base of experience with a product, they may inadvertently use the product after it has gone bad because they did not know the meaning of the product's smell. A method is needed that enables consumers to learn the smell of products that are no longer suitable for use.

SUMMARY OF THE INVENTION

An object of the invention is to provide a method for consumers of a product to sample one or more aromas of the product prior to purchasing the product.

An object of the invention is to provide a method for users of a product to determine if the product has aged or otherwise transitioned into a state in which the product is no longer suitable for use.

An object of the invention is to provide a method for sampling an aroma of a finished consumer product wherein the consumer product has a finished state and an unfinished state.

An object of the invention is to provide a method for sampling an aroma of a consumer product where the consumer product includes a plurality of aromas.

An object of the invention is to provide a method for sampling an aroma bouquet of a consumer product.

An object of the invention is to provide a method for determining the state of a product.

A preferred embodiment of a method of the present invention, as broadly described herein, where a consumer product has a finished state and an unfinished state and is offered for sale to consumers in the unfinished state, includes the steps of characterizing an aroma of a finished state of the product, synthesizing the aroma in response to the characterization, and associating the synthesized aroma with the consumer product.

An alternative preferred embodiment of a method of the present invention, as broadly described herein, where a consumer product has a plurality of aromas, includes the steps of characterizing a selected aroma of the product, synthesizing the selected aroma in response to the characterization, and associating the synthesized aroma with the consumer product.

An alternative preferred embodiment of a method of the present invention, as broadly described herein, where a consumer product has an aroma bouquet that includes a plurality of aromas, includes the steps of characterizing the aroma bouquet, characterizing a selected aroma of the plurality of aromas, synthesizing the aroma bouquet in response to the characterization of the aroma bouquet, synthesizing the selected aroma in response to the characterization of the aroma, intensifying the synthesized aroma, and associating the synthesized aroma bouquet and the intensified synthesized aroma with the consumer product.

An alternative preferred embodiment of a method of the present invention, as broadly described herein, where a product has a first state wherein an aroma is readily detected and a second state wherein the aroma is not readily detected, includes the steps of characterizing the aroma, synthesizing the aroma in response to the characterization, and associating the synthesized aroma with the product.

Additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

Consumer Products with Finished and Unfinished States

Figure 1:
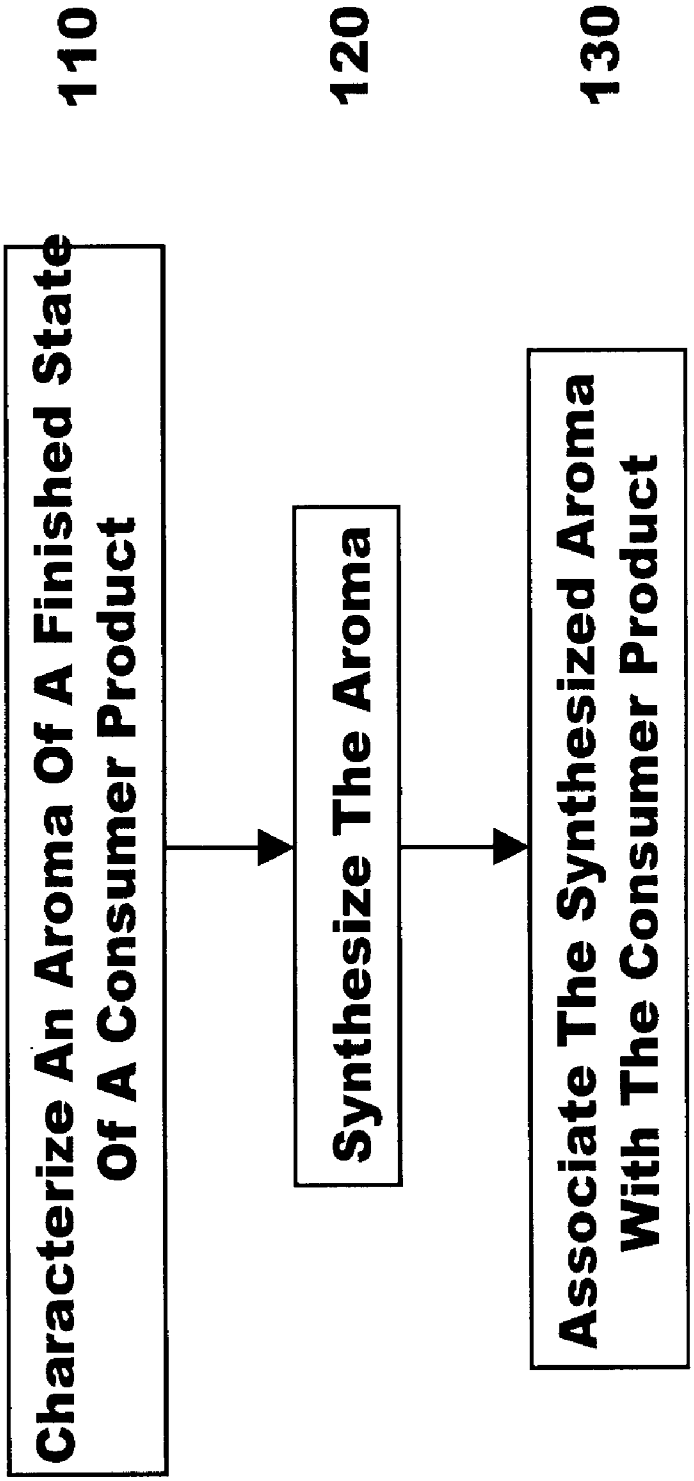
FIG. 1 is a flow chart depicting a preferred embodiment of a method for sampling an aroma of a finished consumer product, where the consumer product has a finished state and an unfinished state.

FIG. 1 depicts a flow chart of a preferred embodiment of a method for sampling an aroma of a finished consumer product where the product is normally offered for sale to consumers in an unfinished state and is brought to a finished state by the consumer, possibly with the addition of other ingredients. For example, cake mix, coffee, biscuit dough, and numerous other food products are commonly sold to consumers in a condition (the unfinished state) that requires cooking and the possible addition of other ingredients in order to achieve the condition in which the product is normally considered suitable for consumption (the finished state). This method includes the steps of characterizing an aroma of a finished state of the product, synthesizing the aroma based on the characterization, and associating the synthesized aroma with the product.

In the preferred embodiment depicted in FIG. 1, the step of characterizing an aroma of a finished state of the product is accomplished by Characterize An Aroma Of A Finished State Of A Consumer Product step 110. In preferred embodiments, various techniques as are known in the art may be used to characterize an aroma. In a preferred embodiment, mass spectrometry is used to characterize an aroma. A summary of applications of mass spectrometry to the characterization of aromas is found in the Mass Spectrometry chapter by Ian Horman in *Analysis of Foods and Beverages* (1984, Academic Press, Inc.). As used herein, "aroma" refers to certain objective chemical characteristics of a product that produce a particular subjective "smell" sense perception in an observer. In a preferred embodiment, for example, mass spectrometry is used to characterize the distinct vanilla-hazelnut aroma of a particular brand of vanilla-hazelnut flavored coffee.

In the preferred embodiment depicted in FIG. 1, the step of synthesizing the aroma based on the characterization is accomplished by Synthesize The Aroma step 120. In preferred embodiments, a variety of techniques as are known in the art may be used to synthesize the aroma based on the information produced by the characterization step. In this specification and in the appended claims, references to synthesizing "the aroma" include processes whereby synthetic aromas are produced that approximate the subjective smell of the desired aroma, even though the synthetic aroma may not precisely or approximately duplicate the objective chemical characteristics of the desired aroma. In a preferred embodiment, chemical compounds with known aromas may be combined, guided by the characterization, to produce a synthetic aroma that approximates the subjective smell of the desired aroma. In an alternate preferred embodiment, aroma samples are isolated from finished products, guided by the characterization, and form the synthetic aroma. In a preferred embodiment, and continuing the above example, commercially available vanilla and hazelnut aromas are selected and combined, as guided by the characterization, to produce a synthetic vanilla-hazelnut aroma that approximates the vanilla-hazelnut aroma of the vanilla-hazelnut flavored coffee.

In the preferred embodiment depicted in FIG. 1, the step of associating the synthesized aroma with the product is accomplished by Associate The Synthesized Aroma With The Consumer Product step 130. In preferred embodiments, various techniques as are known in the art may be used to associate the synthesized aroma with the consumer product.

As used herein, "associate" refers to the creation of a mental relationship in the minds of customers between the synthesized aroma and the consumer product. A mental relationship is established by exhibiting the synthesized aroma in close physical proximity to means for conveying information about the finished consumer product. This information conveying means may be the finished consumer product itself, the consumer product in an unfinished state, a pictorial representation of the consumer product, a textual representation of the consumer product, an advertising display of the consumer product, electronic representations of the consumer product, and other representations of the consumer product as are known in the art. For example, and to continue the above example, a synthesized vanilla-hazelnut aroma may be contained in a scratchable aroma-release label, as is known in the art, that is attached to jars of the particular brand of vanilla-hazelnut coffee. Thus, the consumer may experience the scent of the brewed coffee while making a decision to purchase the coffee in the unfinished (un-brewed) state. In an alternate embodiment, a cake (the finished state) may be displayed in a glass case as part of an advertising display of the cake mix (the unfinished state) while the synthesized aroma is released into the atmosphere near the display by a time-release mechanism as is known in the art. Thus, the consumer may experience the visual sensation of the product in its finished state as well as the scent of the product in its finished state while making a decision to purchase the product in the unfinished state. In a further alternative embodiment, the synthesized aroma may be applied to paper on which a purely textual description of the consumer product is printed, for example, in a magazine ad. Thus, the consumer may develop a connection between the product and its aroma that may later be recalled when the consumer is presented with an opportunity to purchase the product.

In preferred embodiments, associating the synthesized aroma with the consumer product includes the encapsulation of the synthesized aroma in microcapsules as is known in the art. Various known techniques may be used to release samples of the aroma from the microcapsules including the use of manual scratch panels, pull tabs for tearing open microcapsules, and crushing techniques as are know in the art.

In addition to the preferred embodiment described above, where associating the synthesized aroma with the product includes the use of a time-release mechanism for the aroma, other time release means may be employed as are known in the art. For example, in a preferred embodiment, the synthesized aroma is contained in microcapsules where the containment ability of the microcapsules deteriorates over time, thus providing for a gradual release of the synthesized aroma over time.

Figure 5:
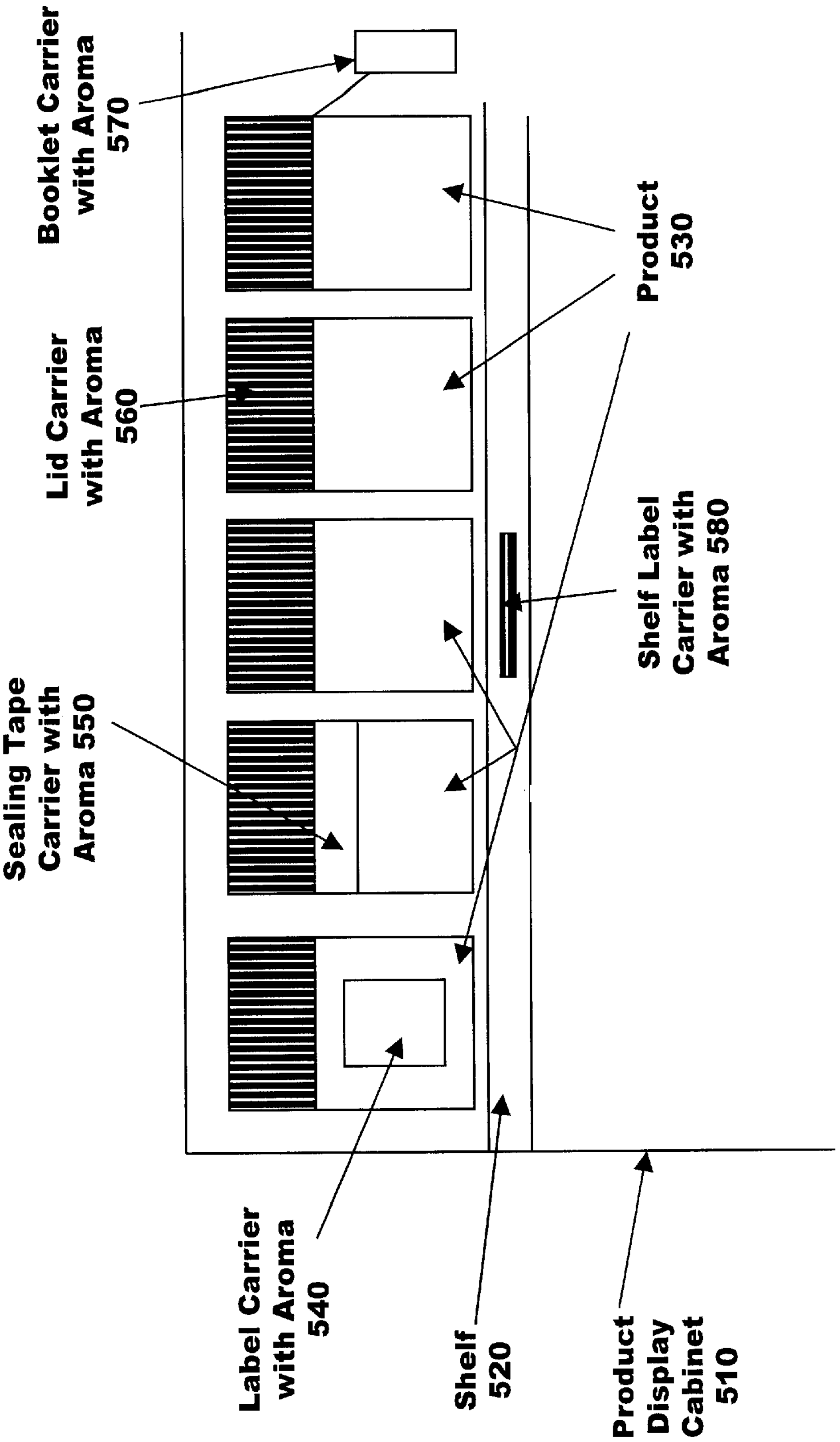
FIG. 5 is a diagram depicting preferred embodiments of apparatus for sampling aromas and determining the state of products.

FIG. 5 depicts preferred embodiments of apparatus for sampling an aroma of a finished consumer product. The apparatus includes an aroma carrier that is associated with a consumer product. As discussed in connection with FIG. 1 above, the consumer product has a finished state and an unfinished state, and is offered for sale to consumers in the unfinished state. The apparatus also includes a synthesized aroma that is carried by the aroma carrier and that is produced by the method for sampling an aroma of a finished consumer product that is discussed in connection with FIG. 1 above.

FIG. 5 depicts preferred embodiments of the apparatus for sampling an aroma of a finished consumer product in the context of a typical store display. The preferred embodiments are arranged on Shelf 520 contained in Product Display Cabinet 510. While a variety of preferred embodiments are depicted in the same Product Display Cabinet 510 for convenience of illustration, a more typical store display would utilize the same preferred embodiment for all of the Products 530 contained in the display. As depicted in FIG. 5, each preferred embodiment of the aroma carrier of the apparatus is considered to be charged with the synthesized aroma in the manner required by that preferred embodiment, as is known in the art. Preferred embodiments of the aroma carrier, charged with the synthesized aroma, are Label Carrier with Aroma 540, Sealing Tape Carrier with Aroma 550, Lid Carrier with Aroma 560, Booklet Carrier with Aroma 570, and Shelf Label Carrier with Aroma 580. Each of these preferred embodiments, except for Shelf Label Carrier with Aroma 580, is associated with Product 530 by being affixed to Product 530. Shelf Label Carrier with Aroma 580 is associated with Product 530 by being affixed to Shelf 520 that is supporting Products 530. Other techniques for associating aroma carriers with products may be employed as are known in the art.

Label Carrier with Aroma 540 may be manufactured, as is known in the art, as a manually scratchable product label with microcapsules containing the synthesized aroma. Other manufacturing techniques may be employed as are known in the art. Sealing Tape Carrier with Aroma 550 may be manufactured, as is known in the art, as a manually scratchable adhesive tape with microcapsules containing the synthesized aroma. Other manufacturing techniques may be employed as are known in the art. Lid Carrier with Aroma 560 may be manufactured, as is known in the art, as a manually scratchable product lid with microcapsules containing the synthesized aroma. Other manufacturing techniques may be employed as are known in the art. Booklet Carrier with Aroma 570 may be manufactured, as is known in the art, as a manually scratchable booklet of product information, affixed to Product 530 by a string, with microcapsules containing the synthesized aroma. Other manufacturing techniques may be employed as are known in the art. Shelf Label Carrier with Aroma 580 may be manufactured, as is known in the art, as a manually scratchable label with microcapsules containing the synthesized aroma. Other manufacturing techniques may be employed as are known in the art.

Additional preferred embodiments of aroma carriers, which are associated with a product through physical proximity and which are not depicted in FIG. 5, include packing materials and containers, product safety barriers (such as sealed inner lids), and plastic cups and eating utensils that are impregnated with the synthesized aroma and release it over time.

As described in connection with FIG. 1 above and as are known in the art, other aroma carriers, which are not depicted in FIG. 5, that may be employed include atomizers, used with or without timed release mechanisms, for releasing the synthesized aroma into the atmosphere; and paper, cloth, or other materials that are impregnated with the synthesized aroma. Such aroma carriers may be associated with a product through the placement of the aroma carriers in close physical proximity to the product. For example and in preferred embodiments, air freshener-type devices, as are known in the art, may be charged with the synthesized aroma and placed in proximity to the product. In further examples, internal store billboards, three-dimensional billboard structures, and computer-driven point-of-sale displays advertising the product may be impregnated with the synthesized aroma or may contain aroma release devices as described herein or as are known in the art.

Consumer Products with a Plurality of Aromas

Figure 2:
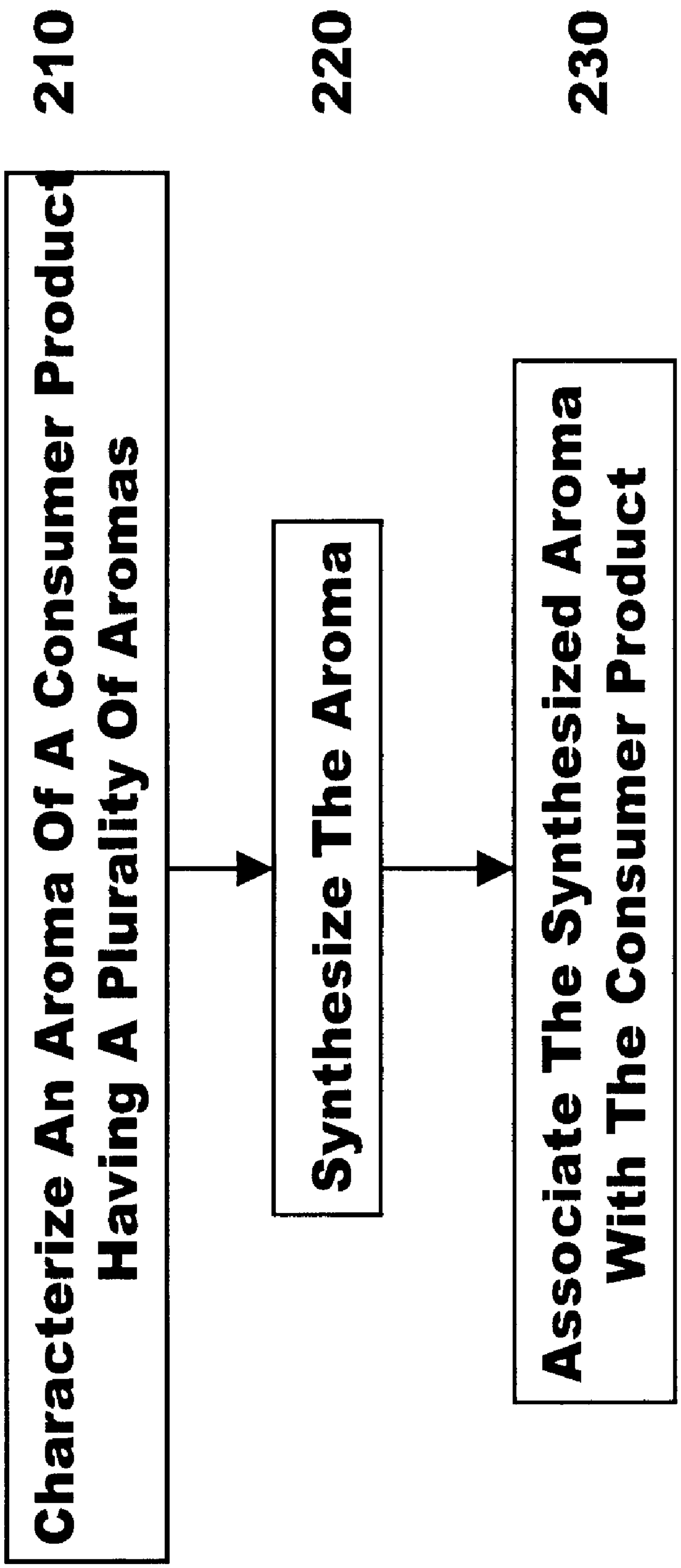
FIG. 2 is a flow chart depicting a preferred embodiment of a method for sampling an aroma of a consumer product where the consumer product includes a plurality of aromas.

FIG. 2 depicts a flow chart of a preferred embodiment of a method for sampling an aroma of a consumer product where the consumer product includes more than one aroma. For example, coffee, ice cream, and cakes, as well as many other consumer products, are often offered for sale with blends of aromas (and flavorings). While coffee is often sold with merely a coffee aroma, specialty coffees may include the aroma of coffee blended with vanilla, chocolate, nut, and other aromas. This method includes the steps of characterizing a selected aroma of a consumer product, synthesizing the selected aroma based on the characterization, and associating the synthesized aroma with the product.

In the preferred embodiment depicted in FIG. 2, the step of characterizing a selected aroma of a consumer product is accomplished by Characterize An Aroma Of A Consumer Product Having A Plurality Of Aromas step 210. In preferred embodiments and as discussed in more detail in reference to FIG. 1 above, mass spectrometry and other techniques as are known in the art may be used to characterize a selected aroma. In a preferred embodiment, for example, mass spectrometry is used to characterize the vanilla aroma of a particular brand of vanilla-hazelnut coffee that has the aromas of vanilla, hazelnuts, and coffee.

In the preferred embodiment depicted in FIG. 2, the step of synthesizing the selected aroma based on the characterization is accomplished by Synthesize The Aroma step 220. In preferred embodiments and as discussed in more detail in reference to FIG. 1 above, various techniques as are known in the art may be used to synthesize the selected aroma based on the information produced by the characterization step. In a preferred embodiment, and continuing the above example, commercially available vanilla aromas are selected and combined, as guided by the characterization, to produce a synthetic vanilla aroma that approximates the vanilla aroma of the vanilla-hazelnut coffee.

In the preferred embodiment depicted in FIG. 2, the step of associating the synthesized aroma with the product is accomplished by Associate The Synthesized Aroma With The Consumer Product step 230. In preferred embodiments and as discussed in more detail in reference to FIG. 1 above, various techniques as are known in the art may be used to associate the synthesized aroma with the consumer product. For example, and to continue the above example, a paper flyer describing a particular brand of vanilla-hazelnut coffee may be distributed to potential purchasers of the product. The paper is soaked in the synthesized vanilla aroma. As potential purchasers read the flyer, they would experience the vanilla smell and thus develop a mental association between the hopefully delicious vanilla smell and the particular brand of vanilla-hazelnut coffee.

In a preferred embodiment not depicted in FIG. 2, the associating step includes the step of intensifying the synthesized aroma. Various techniques may be used, as are known in the art, to intensify the synthesized aroma. The smell of a particular aroma from a product will normally be experienced with a particular intensity relative to background aromas and the other aromas of the product. To create a stronger mental association between a particular aroma and a consumer product, it may be beneficial to intensify the potential purchaser's experience of the aroma. In a preferred embodiment, and as a variation of the above example, the paper flyer may be soaked in a intensified version of the synthesized vanilla aroma in order to increase the mental association developed between the vanilla smell and the particular brand of vanilla-hazelnut coffee.

FIG. 5 also depicts preferred embodiments of apparatus for sampling an aroma of a consumer product. In these preferred embodiments, the apparatus includes an aroma carrier that is associated with the consumer product. As discussed in connection with FIG. 2 above, the consumer product has a plurality of aromas. The apparatus also includes a synthesized aroma that is carried by the aroma carrier and that is produced by the method for sampling an aroma of a consumer product that is discussed in connection with FIG. 2. A detailed discussion of the aroma carriers and their association with products is provided in reference to FIG. 5 in the above section entitled "Consumer Products with Finished and Unfinished States."

Consumer Products with Aroma Bouquets

Figure 3:
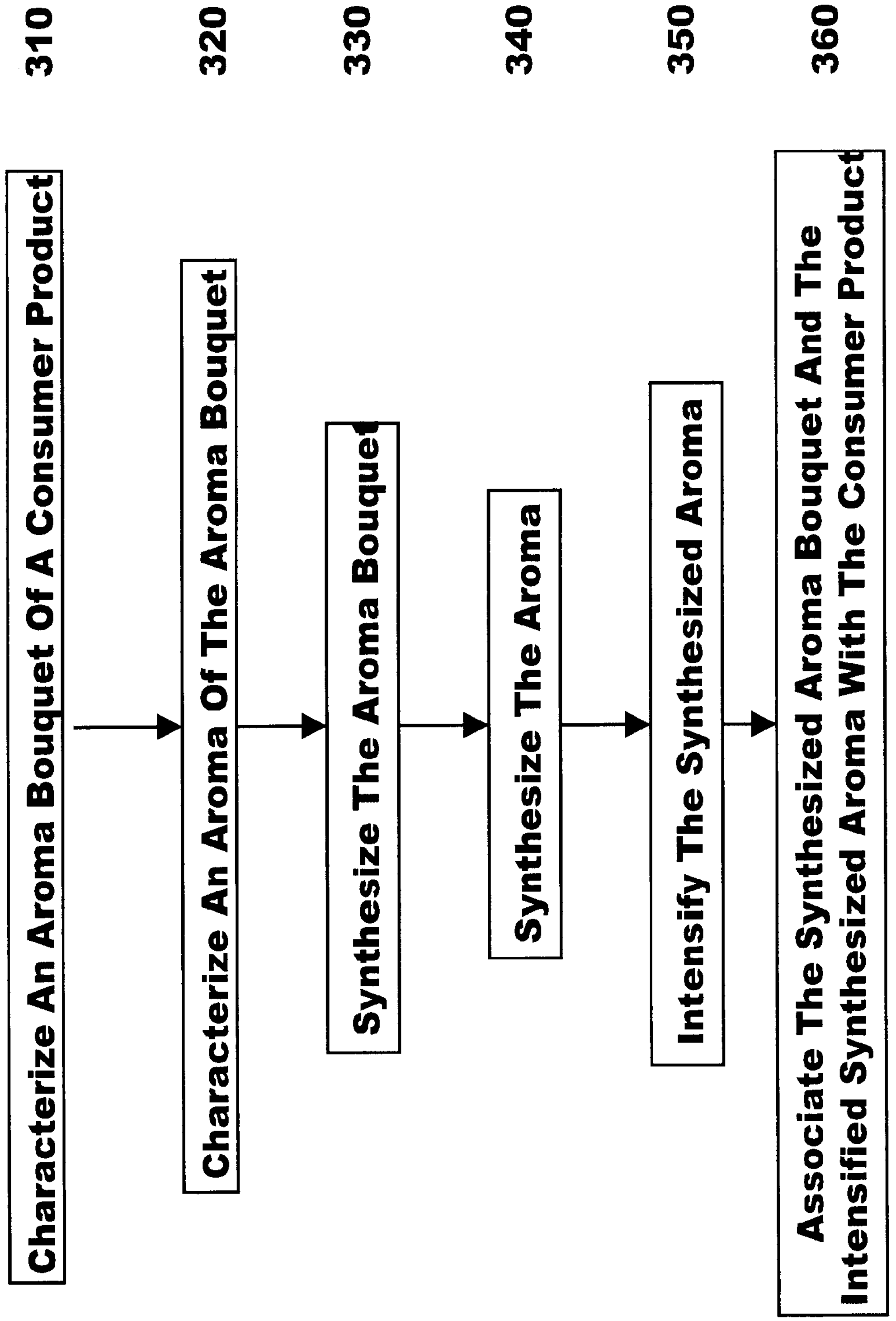
FIG. 3 is a flow chart depicting a preferred embodiment of a method for sampling an aroma bouquet of a consumer product.

FIG. 3 depicts a flow chart of a preferred embodiment of a method for sampling an aroma bouquet of a consumer product, where the consumer product includes more than one aroma and a plurality of these aromas are taken together to form an aroma bouquet of the consumer product. In a preferred embodiment, an aroma bouquet consists of all of the aromas of a consumer product, taken together. For example, coffee, ice cream, fruit drinks, and many other consumer products are often offered for sale with blends of aromas (and flavorings). A specialty coffee may be offered with the aromas of vanilla, hazelnut, and coffee. An aroma bouquet of this specialty coffee is vanilla-hazelnut. An alternative aroma bouquet is vanilla-hazelnut-coffee.

This method of the invention includes the steps of characterizing an aroma bouquet of a consumer product, characterizing a selected aroma of the plurality of aromas of the aroma bouquet, synthesizing the aroma bouquet in response to the aroma bouquet characterization, synthesizing the selected aroma in response to the aroma characterization, intensifying the synthesized aroma, and associating the synthesized aroma bouquet and the intensified synthesized aroma with the consumer product.

In the preferred embodiment depicted in FIG. 3, the step of characterizing an aroma bouquet of a consumer product is accomplished by Characterize An Aroma Bouquet Of A Consumer Product step 310. In preferred embodiments, mass spectroscopy and other techniques as are known in the art may be used to characterize an aroma bouquet. As is known in the art, the techniques for characterizing an aroma discussed above in reference to FIG. 1 may also be used for the characterization of aroma bouquets. In a preferred embodiment, for example, mass spectrometry is used to characterize the vanilla-hazelnut aroma bouquet of a particular brand of vanilla-hazelnut coffee that has the aromas of vanilla, hazelnuts, and coffee.

In the preferred embodiment depicted in FIG. 3, the step of characterizing a selected aroma of the plurality of aromas of the aroma bouquet is accomplished by Characterize An Aroma Of The Aroma Bouquet step 320. In preferred embodiments and as discussed in more detail in reference to FIG. 1 above, mass spectroscopy and other techniques as are known in the art may be used to characterize a selected aroma. In a preferred embodiment, and continuing the above example, mass spectrometry is used to characterize the vanilla aroma of the vanilla-hazelnut aroma bouquet of a particular brand of vanilla-hazelnut coffee.

In the preferred embodiment depicted in FIG. 3, the step of synthesizing the aroma bouquet in response to the aroma bouquet characterization is accomplished by Synthesize The Aroma Bouquet step 330. In preferred embodiments, various techniques as are known in the art, may be used to synthesize the aroma bouquet based on the information produced by the aroma bouquet characterization step. As is known in the art, the techniques for synthesizing an aroma discussed above in reference to FIG. 1 may also be used for synthesizing an aroma bouquet. In a preferred embodiment, and continuing the above example, commercially available vanilla and hazelnut aromas are selected and combined, as guided by the aroma bouquet characterization, to produce a synthetic vanilla-hazelnut aroma bouquet that approximates the vanilla-hazelnut aroma bouquet of the vanilla-hazelnut coffee.

In the preferred embodiment depicted in FIG. 3, the step of synthesizing the selected aroma in response to the aroma characterization is accomplished by Synthesize The Aroma step 340. In preferred embodiments and as discussed in more detail in reference to FIG. 1 above, various techniques as are known in the art may be used to synthesize the selected aroma based on the information produced by the aroma characterization step. In a preferred embodiment, and continuing the above example, commercially available vanilla aromas are selected and combined, as guided by the aroma characterization, to produce a synthetic vanilla aroma that approximates the vanilla aroma of the vanilla-hazelnut aroma bouquet of a particular brand of vanilla-hazelnut coffee.

In the preferred embodiment depicted in FIG. 3, the step of intensifying the synthesized aroma is accomplished by Intensify The Synthesized Aroma step 350. In preferred embodiments and as discussed above in reference to FIG. 2, various techniques may be used as are known in the art to intensify the smell of the synthesized aroma relative to the smell of the aroma bouquet. In a preferred embodiment, and continuing the above example, the synthetic vanilla aroma is intensified relative to the vanilla-hazelnut aroma bouquet.

In the preferred embodiment depicted in FIG. 3, the step of associating the synthesized aroma bouquet and the intensified synthesized aroma with the consumer product is accomplished by Associate The Synthesized Aroma Bouquet And The Intensified Synthesized Aroma With The Consumer Product step 360. In preferred embodiments and as discussed in more detail in reference to FIG. 1 above, various techniques as are known in the art may be used to associate the intensified synthesized aroma with the consumer product. These same techniques may also be used to associate the synthesized aroma bouquet with the consumer product. For example, and to continue the above example, a shelf label including an aroma carrier may be attached to a shelf display of the vanilla-hazelnut coffee. The aroma carrier holds microcapsules that are charged with the intensified synthesized vanilla aroma and the synthesized vanilla-hazelnut aroma bouquet. As potential purchasers view the vanilla-hazelnut coffee they would be able to scratch the shelf label and experience the mingled vanilla and vanilla-hazelnut smells, and thus develop a mental association between the vanilla and vanilla-hazelnut smells and the particular brand of vanilla-hazelnut coffee.

FIG. 5 also depicts preferred embodiments of apparatus for sampling an aroma bouquet of a consumer product. In these preferred embodiments, the apparatus includes an aroma carrier that is associated with the consumer product. As discussed in connection with FIG. 3 above, the consumer product has an aroma bouquet including a plurality of aromas. The apparatus also includes an intensified synthesized aroma and a synthesized aroma bouquet that are carried by the aroma carrier and that are produced by the method for sampling an aroma bouquet of a consumer product that is discussed in connection with FIG. 3. A detailed discussion of the aroma carriers and their association with products is provided in reference to FIG. 5 in the above section entitled "Consumer Products with Finished and Unfinished States."

Products with State-Dependent Aromas

Figure 4:
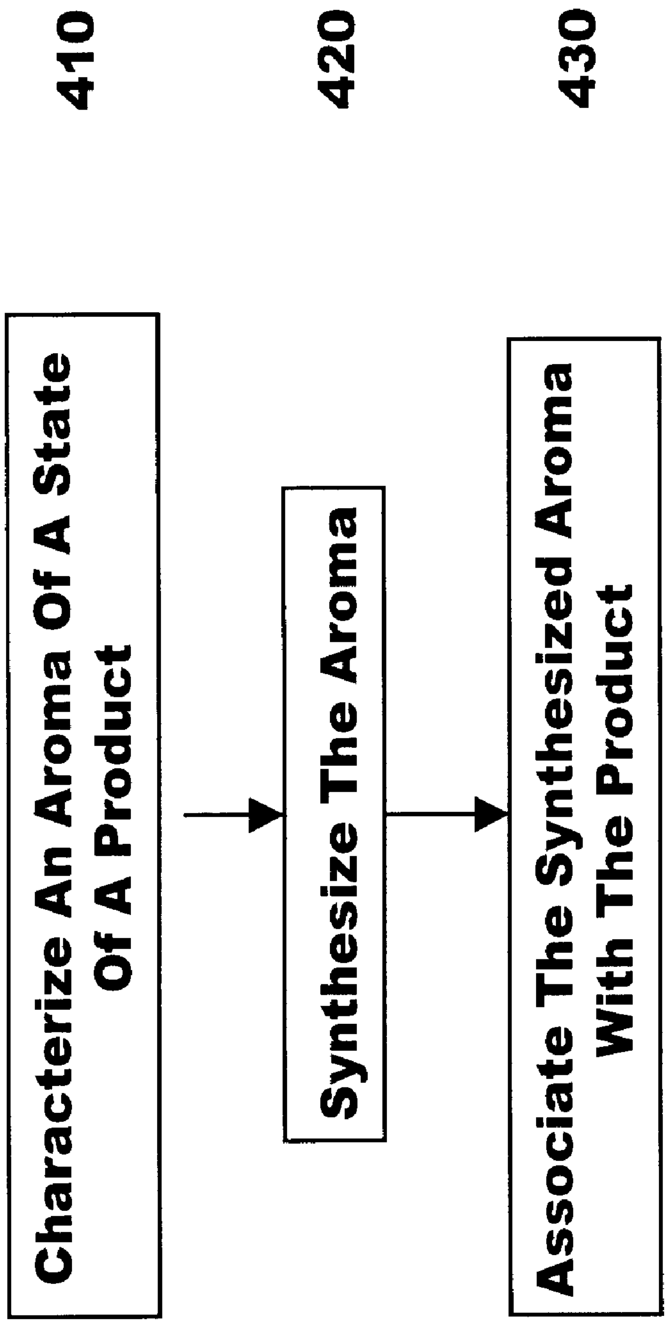
FIG. 4 is a flow chart depicting a preferred embodiment of a method for determining the state of a product.

FIG. 4 depicts a flow chart of a preferred embodiment of a method for determining the state of a product where the product has a pre-specified readily detectable aroma while the product is in a first state and where the pre-specified aroma is not readily detectable while the product is in a second state. For example, it is well known that meat, fish, and eggs develop distinct aromas as they age. The first state for these products is when the product has aged, developed the distinct aroma, and is not suitable for consumption. The second state for these products is when the product is fresh and suitable for consumption.

While the previous examples involved naturally occurring aromas, aromas may also be added to products to indicate state changes. For example, a lemon aroma may be added to a product that does not normally have a lemon aroma, such as a battery. As is known in the art, the lemon scent may be designed to substantially dissipate after a known period of time. This known period of time can be set approximately to coincide with the shelf-life of the battery. Thus, the battery has a lemon aroma while it is usable, and substantially loses the lemon odor at the end of its useful life. Similarly, a household insecticide or other toxic substance can be given a distinct odor that dissipates at approximately the same rate that the substance loses toxicity. When the substance no longer has the distinct odor, the user will know that the substance is no longer toxic.

By providing a user of the product with the opportunity to experience the odor that is indicative of the state of the product, the user will be better able to determine the state. For example, the contents of a can of a certain brand of coffee may be given a distinct vanilla aroma that is approximately timed to dissipate at the end of the coffee's shelf life. A brochure accompanying the coffee is saturated with the vanilla aroma and informs the purchaser that the coffee should only be consumed if it has a vanilla smell similar to that of the brochure. Thus even a purchaser unfamiliar with the vanilla smell will be able to determine if the coffee is suitable for consumption. This state-determining method includes the steps of characterizing an aroma of a state of a product, synthesizing the aroma based on the characterization, and associating the synthesized aroma with the product.

In the preferred embodiment depicted in FIG. 4, the step of characterizing an aroma of a state of a product is accomplished by Characterize An Aroma Of A State Of A Product step 410. In preferred embodiments and as discussed in more detail in reference to FIG. 1 above, mass spectrometry and other techniques as are known in the art may be used to characterize an aroma of a state of a product. In a preferred embodiment, for example, mass spectrometry is used to characterize the distinct "fruity" aroma produced by a certain wine when in an optimum state for consumption. The "fruity" aroma is substantially not present in the wine when it is immature and after it has aged too long.

In the preferred embodiment depicted in FIG. 4, the step of synthesizing the aroma based on the characterization is accomplished by Synthesize The Aroma step 420. In preferred embodiments and as discussed in more detail in reference to FIG. 1 above, various techniques as are known in the art may be used to synthesize the aroma based on the information produced by the characterization step. In a preferred embodiment, and continuing the above example, commercially available aromas are selected and combined, as guided by the characterization, to produce a synthetic "fruity" aroma that approximates the "fruity" aroma of the wine.

In the preferred embodiment depicted in FIG. 4, the step of associating the synthesized aroma with the product is accomplished by Associate The Synthesized Aroma With The Product step 430. In preferred embodiments and as discussed in more detail in reference to FIG. 1 above, various techniques as are know in the art may be used to associate the synthesized aroma with the product. For example, and to continue the above example, the label of each wine bottle and the cardboard case holding a dozen bottles of the wine are both scented with the synthesized "fruity" aroma. A notice on the case and on each label states that the wine should only be consumed if it has the same "fruity" smell as the case and labels. Purchasers would experience the "fruity" smell from the case and labels and thus develop a mental association between the "fruity" smell and the wine in a state suitable for consumption.

FIG. 5 also depicts preferred embodiments of apparatus for determining the state of a product. In these preferred embodiments, the apparatus includes an aroma carrier that is associated with the product. As discussed in connection with FIG. 4 above, the product has a readily detectable aroma while in a first state, but the aroma is not readily detectable when the product is in a second state. The apparatus also includes a synthesized aroma that is carried by the aroma carrier and that is produced by the method for determining the state of a product that is discussed in connection with FIG. 4. A detailed discussion of the aroma carriers and their association with products is provided in reference to FIG. 5 in the above section entitled "Consumer Products with Finished and Unfinished States."

It will be apparent to those skilled in the art that various modifications can be made to this invention of methods and apparatus for sampling product aromas, without departing from the scope or spirit of the invention or of the claims. It is also intended that the present invention and appended claims cover modifications, variations and equivalents of the methods and apparatus for sampling product aromas of the present invention.

I claim:

1. A method for sampling an aroma of an ingestible consumer product having a finished state and an unfinished state, comprising:

characterizing the aroma of the ingestible consumer product in the finished state, wherein the ingestible consumer product is offered for sale to consumers in the unfinished state;

responsive to the characterization; synthesizing a synthesized aroma similar to the aroma of the ingestible consumer product in the finished state; and associating the synthesized aroma with the ingestible consumer product, comprising releasing the synthesized aroma at a time when the ingestible consumer product is offered for sale in the unfinished state.

2. The method of claim 1, wherein the characterizing comprises using mass spectrometry.

3. The method of claim 1, wherein the associating further comprises relating the synthesized aroma to means for conveying information about the ingestible consumer product in the finished state.

4. The method of claim 3, wherein the information conveying means comprises an object selected from the group consisting of the ingestible consumer product offered for sale in the unfinished state, a package of the ingestible consumer product offered for sale in the unfinished state, a pictorial representation of the ingestible consumer product, a textual representation of the ingestible consumer product, and an advertising display of the ingestible consumer product.

5. The method of claim 1, wherein the releasing comprises timed releasing of the synthesized aroma.

6. The method of claim 1, wherein the releasing comprises forming microcapsules encapsulating the synthesized aroma.

7. A combination comprising:

an ingestible consumer product, having a finished state and an unfinished state;

a synthesized aroma, similar to an aroma of the ingestible consumer product in the finished state; and an aroma carrier configured to release the synthesized aroma in association with the ingestible consumer product at a time when the ingestible consumer product is offered for sale to consumers in the unfinished state.

8. A method for sampling a selected aroma of an ingestible consumer product, wherein the ingestible consumer product has a finished state having a plurality of aromas and an unfinished state comprising:

selecting an aroma from the plurality of aromas;

characterizing the selected aroma;

responsive to the characterization, synthesizing a synthesized aroma similar to the selected aroma; and associating the synthesized aroma with the ingestible consumer product, comprising releasing the synthesized aroma at a time when the ingestible consumer product is offered for sale in the unfinished state.

9. The method of claim 8, further comprising intensifying the synthesized aroma; and wherein the associating further comprises releasing the intensified synthesized aroma in association with the ingestible consumer product when the ingestible consumer product is offered for sale in the unfinished state.

10. The method of claim 8 or claim 9, wherein the characterizing comprises using mass spectrometry.

11. The method of claim 8 or claim 9, wherein the associating further comprises relating the synthesized aroma to means for conveying information about the ingestible consumer product.

12. The method of claim 11, wherein the information conveying means comprises an object selected from the group consisting of the ingestible consumer product, a package of the ingestible consumer product, a pictorial representation of the ingestible consumer product, a textual representation of the ingestible consumer product, and an advertising display of the ingestible consumer product.

13. The method of claim 8 or claim 9, wherein the releasing comprises timed releasing of the synthesized aroma.

14. The method of claim 8 or claim 9, wherein the releasing comprises forming microcapsules encapsulating the synthesized aroma.

15. A combination comprising:

an ingestible consumer product having an unfinished state and a finished state having a plurality of aromas including a selected aroma;

a synthesized aroma, similar to the selected aroma; and an aroma carrier configured to release the synthesized aroma in association with the ingestible consumer product at a time when the ingestible consumer product is offered for sale to consumers in the unfinished state.

16. A combination comprising:

an ingestible consumer product, having an unfinished state and a finished state having a plurality of aromas including a selected aroma;

an intensified aroma produced by intensifying a synthesized aroma similar to the selected aroma; and an aroma carrier configured to release the intensified synthesized aroma in association with the ingestible consumer product at a time when the ingestible consumer product is offered for sale to consumers in the unfinished state.

17. A method of sampling an aroma bouquet comprising a plurality of aromas of an ingestible consumer product having an unfinished state and a finished state having the aroma bouquet, the method comprising:

characterizing the aroma bouquet;

characterizing a selected aroma of the plurality of aromas;

responsive to the aroma-bouquet characterization, synthesizing a bouquet-synthesized-aroma similar to the aroma bouquet;

responsive to the selected-aroma characterization, synthesizing a selected-synthesized-aroma similar to the selected aroma;

intensifying the selected-synthesized-aroma; and associating the intensified selected-synthesized-aroma and the bouquet-synthesized-aroma with the ingestible consumer product, comprising releasing the intensified selected-synthesized-aroma and the bouquet-synthesized-aroma at a time when the ingestible consumer product is offered for sale in the unfinished state.

18. The method of claim 17, wherein the aroma-bouquet characterizing comprises using mass spectrometry and the selected-aroma characterizing comprises using mass spectrometry.

19. The method of claim 17, wherein the associating step comprises relating the selected-synthesized-aroma and the bouquet-synthesized-aroma to means for conveying information about the ingestible consumer product.

20. The method of claim 19, wherein the information conveying means comprises an object selected from the group consisting of the ingestible consumer product, a package of the ingestible consumer product, a pictorial representation of the ingestible consumer product, a textual representation of the ingestible consumer product, and an advertising display of the ingestible consumer product.

21. The method of claim 17, wherein the releasing comprises timed releasing of the intensified selected-synthesized-aroma and timed releasing of the bouquet-synthesized aroma.

22. The method of claim 17, wherein the releasing comprises forming microcapsules encapsulating the intensified selected-synthesized-aroma and the bouquet-synthesized-aroma.

23. A combination comprising:

an ingestible consumer product having an unfinished state and a finished state having an aroma bouquet comprising a plurality of aromas including a selected aroma;

an intensified-selected-synthesized-aroma, produced by characterizing the selected aroma;

responsive to the selected-aroma characterization, synthesizing a synthesized-selected-aroma; and intensifying the synthesized-selected-aroma; and a bouquet-synthesized-aroma, produced by characterizing the aroma bouquet; and responsive to the aroma-bouquet characterization, synthesizing the bouquet-synthesized-aroma wherein the bouquet-synthesized-aroma is similar to the aroma bouquet; and an aroma carrier configured to release the intensified-selected-synthesized-aroma and the bouquet-synthesized-aroma in association with the ingestible consumer product at a time when the ingestible consumer product is offered for sale to consumers in the unfinished state.

24. A method for sampling an aroma of an ingestible consumer product having a first state wherein the aroma is not readily detectable by a consumer and a second state wherein the aroma is readily detectable by the consumer, the method comprising:

characterizing the aroma;

responsive to the characterization, synthesizing a synthesized aroma similar to the aroma; and associating the synthesized aroma with the ingestible consumer product, comprising releasing the synthesized aroma at a time when the ingestible consumer product is offered for sale in the first state.

25. The method of claim 24, wherein the characterizing comprises using mass spectrometry.

26. The method of claim 24, wherein the associating comprises relating the synthesized aroma to means for conveying information about the ingestible consumer product.

27. The method of claim 24, wherein the information conveying means comprises an object selected from the group consisting of the ingestible consumer product in the first state, a package of the ingestible consumer product in the first state, the ingestible consumer product in the second state, a package of the ingestible consumer product in the second state, a pictorial representation of the ingestible consumer product, a textual representation of the ingestible consumer product, and an advertising display of the ingestible consumer product.

28. The method of claim 24, wherein the releasing comprises time releasing of the synthesized aroma.

29. The method of claim 24, wherein the releasing comprises forming microcapsules encapsulating the synthesized aroma.

30. A combination comprising:

an ingestible consumer product having a first state wherein an aroma of the ingestible consumer product is not readily detectable by a consumer, and a second state wherein the aroma is readily detectable by the consumer:

a synthesized aroma, similar to the readily-detectable aroma of the ingestible consumer product in the second state; and an aroma carrier configured to release the synthesized aroma in association with the ingestible consumer product at a time when the ingestible consumer product is offered for sale to consumers in the first state.

31. A method for sampling an aroma of an ingestible consumer product having a first state and a second state having a second-state aroma, the method comprising:

characterizing the second-state aroma;

responsive to the characterization, synthesizing a synthesized aroma similar to the second-state aroma; and associating the synthesized aroma with the ingestible consumer product, comprising releasing the synthesized aroma at a time when the ingestible consumer product is offered for sale to consumers in the first state.

32. The method of claim 31, wherein the characterizing comprises using mass spectrometry.

33. The method of claim 31, wherein the associating further comprises relating the synthesized aroma to means for conveying information about the ingestible consumer product in the finished state.

34. The method of claim 33, wherein the information conveying means comprises an object selected from the group consisting of the ingestible consumer product offered for sale in the first state, the ingestible consumer product in the second state, a package of the ingestible consumer product offered for sale in the second state, a pictorial representation of the ingestible consumer product, a textural representation of the ingestible consumer product, and an advertising display of the ingestible consumer product.

35. The method of claim 31, wherein the releasing comprises timed releasing of the synthesized aroma.

36. The method of claim 31, wherein the releasing comprises forming microcapsules encapsulating the synthesized aroma.

37. A combination comprising:

an ingestible consumer product having a first state and a second state having a second-state aroma;

a synthesized aroma, similar to the second-state aroma; and an aroma carrier configured to release the synthesized aroma in association with the ingestible consumer product at a time when the ingestible consumer product is offered for sale to consumers in the first state.

38. A method for sampling an aroma of an ingestible consumer product having a finished state and an unfinished state, comprising:

characterizing the aroma of the ingestible consumer product in the finished state;

responsive to the characterization, synthesizing a synthesized aroma similar to the aroma of the ingestible consumer product in the finished state; and associating the synthesized aroma with the ingestible consumer product, comprising releasing the synthesized aroma prior to a transition of the ingestible consumer product from the unfinished state to the finished state.

39. The method of claim 38, wherein the characterizing comprises using mass spectrometry.

40. The method of claim 38, wherein the associating comprises relating the synthesized aroma to means for conveying information about the ingestible consumer product in the finished state.

41. The method of claim 40, wherein the information conveying means comprises an object selected from the group consisting of the ingestible consumer product offered for sale in the unfinished state, a package of the ingestible consumer product offered for sale in the unfinished state, a pictorial representation of the ingestible consumer product, a textual representation of the ingestible consumer product, and an advertising display of the ingestible consumer product.

42. The method of claim 38, wherein the releasing comprises timed releasing of the synthesized aroma.

43. The method of claim 38, wherein the releasing comprises forming microcapsules encapsulating the synthesized aroma.

44. A combination comprising:

an ingestible consumer product having a finished state and an unfinished state;

a synthesized aroma, similar to an aroma of the ingestible consumer product in the finished state; and an aroma carrier configured to release the synthesized aroma in association with the ingestible consumer product prior to a transition of the ingestible consumer product from the unfinished state to the finished state.

45. A method for sampling a selected aroma of an ingestible consumer product, wherein the ingestible consumer product has a finished state having a plurality of aromas and an unfinished state, comprising:

selecting an aroma from the plurality of aromas;

characterizing the selected aroma;

responsive to the characterization, synthesizing a synthesized aroma similar to the selected aroma; and associating the synthesized aroma with the ingestible consumer product comprising releasing the synthesized aroma prior to a transition of the ingestible consumer product from the unfinished state to the finished state.

46. The method of claim 45, further comprising intensifying the synthesized aroma; and wherein the associating comprises releasing the intensified synthesized aroma prior to a transition of the ingestible consumer product from the unfinished state to the finished state.

47. The method of claim 45 or claim 46, wherein the characterizing comprises using mass spectrometry.

48. The method of claim 45 or claim 46, wherein the associating further comprises relating the intensified synthesized aroma to means for conveying information about the ingestible consumer product.

49. The method of claim 48, wherein the information conveying means comprises an object selected from the group consisting of the ingestible consumer product, a package of the ingestible consumer product, a pictorial representation of the ingestible consumer product, a textual representation of the ingestible consumer product, and an advertising display of the ingestible consumer product.

50. The method of claim 45 or claim 46, wherein the releasing comprises timed releasing of the intensified synthesized aroma.

51. The method of claim 45 or claim 46, wherein the releasing comprises forming microcapsules encapsulating the intensified synthesized aroma.

52. A combination comprising:

an ingestible consumer product having a finished state having a plurality of aromas including a selected aroma, and an unfinished state;

a synthesized aroma, similar to the selected aroma; and an aroma carrier configured to release the synthesized aroma in association with the ingestible consumer product prior to a transition of the ingestible consumer product from the unfinished state to the finished state.

53. A combination comprising:

an ingestible consumer product having a finished state having a plurality of aromas including a selected aroma, and an unfinished state;

an intensified aroma produced by intensifying a synthesized aroma similar to the selected aroma; and an aroma carrier configured to release the intensified synthesized aroma in association with the ingestible consumer product prior to a transition of the ingestible consumer product from the unfinished state to the finished state.

54. A method for sampling an aroma bouquet comprising a plurality of aromas of an ingestible consumer product having an unfinished state and a finished state having the aroma bouquet, the method comprising;

characterizing the aroma bouquet, characterizing a selected aroma of the plurality of aromas;

responsive to the aroma-bouquet characterization, synthesizing a bouquet synthesized-aroma similar to the aroma bouquet;

responsive to the selected-aroma characterization, synthesizing a selected-synthesized-aroma similar to the selected aroma;

intensifying the selected-synthesized-aroma; and associating the intensified selected-synthesized-aroma and the bouquet-synthesized-aroma with the ingestible consumer product by releasing the intensified selected-synthesized-aroma and the bouquet-synthesized-aroma in association with the ingestible consumer product prior to a transition of the ingestible consumer product from the unfinished state to the finished state.

55. The method of claim 54, wherein the aroma-bouquet characterizing comprises using mass spectrometry and the selected-aroma characterizing comprises using mass spectrometr.

56. The method of claim 54, wherein the associating comprises relating the intensified selected-synthesized-aroma and the bouquet-synthesized-aroma to means for conveying information about the ingestible consumer product.

57. The method of claim 56, wherein the information conveying means comprises an object selected from the group consisting of the ingestible consumer product, a package of the ingestible consumer product, a pictorial representation of the ingestible consumer product, a textual representation of the ingestible consumer product, and an advertising display of the ingestible consumer product.

58. The method of claim 54, wherein the releasing comprises timed releasing of the intensified selected-synthesized-aroma and timed releasing of the bouquet-synthesized aroma.

59. The method of claim 54, wherein the releasing comprises forming microcapsules encapsulating the intensified selected-synthesized-aroma and the bouquet-synthesized-aroma.

60. A combination comprising:

an ingestible consumer product having a finished state having an aroma bouquet comprising a plurality of aromas including a selected aroma, and an unfinished state;

an intensified-selected-synthesized-aroma, produced by characterizing the selected aroma;

responsive to the selected-aroma characterization, synthesizing a synthesized-selected-aroma similar to the selected aroma; and intensifying the synthesized-selected-aroma;

a bouquet-synthesized-aroma, produced by characterizing the aroma bouquet; and responsive to the aroma-bouquet characterization, synthesizing the bouquet-synthesized-aroma, wherein the bouquet-synthesized-aroma is similar to the aroma bouquet; and an aroma carrier configured to release the intensified-selected-synthesized-aroma and the bouquet-synthesized-aroma in association with the ingestible consumer product prior to a transition of the ingestible consumer product from the unfinished state to the finished state.

61. A method for sampling an aroma of an ingestible consumer product having a first state wherein the aroma is not readily detectable by a consumer and a second state wherein the aroma is readily detectable by the consumer, the method comprising:

characterizing the aroma;

responsive to the characterization, synthesizing a synthesized aroma similar to the aroma; and associating the synthesized aroma with the ingestible consumer product, comprising releasing the synthesized aroma prior to a transition of the ingestible consumer product from the first state to the second state.

62. The method of claim 61, wherein the characterizing comprises using mass spectrometry.

63. The method of claim 61, wherein the associating comprises relating the synthesized aroma to means for conveying information about the ingestible consumer product.

64. The method of claim 63, wherein the information conveying means comprises an object selected from the group consisting of the ingestible consumer product in the first state, a package of the ingestible consumer product in the first state, the ingestible consumer product in the second state, a package of the ingestible consumer product in the second state, a pictorial representation of the ingestible consumer product, a textual representation of the ingestible consumer product, and an advertising display of the ingestible consumer product.

65. The method of claim 61, wherein the releasing comprises timed releasing of the synthesized aroma.

66. The method of claim 61, wherein the releasing comprises forming microcapsules encapsulating the synthesized aroma.

67. A combination comprising:

an ingestible consumer product having a first state wherein an aroma is not readily detectable by a consumer and a second state wherein the aroma is readily detectable by the consumer;

a synthesized aroma, similar to the readily-detectable aroma of the ingestible consumer product in the second state; and an aroma carrier configured to release the synthesized aroma in association with the ingestible consumer product prior to a transition of the consumer product from the first state to the second state.

68. A method for sampling an aroma of an ingestible consumer product having a first state and a second state having a second-state aroma, the method comprising:

characterizing the second-state aroma;

responsive to the characterization, synthesizing a synthesized aroma similar to the second-state aroma; and associating the synthesized aroma with the ingestible consumer product, comprising releasing the synthesized aroma prior to a transition of the ingestible consumer product from the first state to the second state.

69. The method of claim 68, wherein the characterizing comprises using mass spectrometry.

70. The method of claim 68, wherein the associating further comprises relating the synthesized aroma to means for conveying information about the ingestible consumer product in the second state.

71. The method of claim 70, wherein the information conveying means comprises an object selected from the group consisting of the ingestible consumer product, a package of the ingestible consumer product, a pictorial representation of the ingestible consumer product, a textual representation of the ingestible consumer product and an advising display of the ingestible consumer product.

72. The method of claim 68, wherein the releasing comprises timed releasing of the synthesized aroma.

73. The method of claim 68, wherein the releasing comprises forming microcapsules encapsulating the synthesized aroma.

74. A combination comprising:

an ingestible consumer product having a first state and second state having a second-state aroma, the combination comprising:

a synthesized aroma, similar to the second-state aroma; and an aroma carrier configured to release the synthesized aroma in association with the ingestible consumer product prior to a transition of the ingestible consumer product from the first state to the second state.

* * * * *